(12) United States Patent
Seo et al.

(10) Patent No.: US 11,567,280 B2
(45) Date of Patent: Jan. 31, 2023

(54) SPLICE SLEEVE HOLDER NEST

(71) Applicant: Optical Cable Corporation, Roanoke, VA (US)

(72) Inventors: Sumio Seo, Wallingford, VT (US); Jerry Howe, Candler, NC (US); Curtis Wright, Fairview, NC (US)

(73) Assignee: Optical Cable Corporation, Roanoke, VA (US)

( * ) Notice: Subject to any disclaimer, the term of this patent is extended or adjusted under 35 U.S.C. 154(b) by 7 days.

(21) Appl. No.: 17/157,663

(22) Filed: Jan. 25, 2021

(65) Prior Publication Data

US 2021/0231898 A1 Jul. 29, 2021

Related U.S. Application Data

(60) Provisional application No. 62/964,814, filed on Jan. 23, 2020, provisional application No. 63/105,555, filed on Oct. 26, 2020.

(51) Int. Cl.
*G02B 6/00* (2006.01)
*G02B 6/44* (2006.01)

(52) U.S. Cl.
CPC ................. *G02B 6/4454* (2013.01)

(58) Field of Classification Search
CPC .... G02B 6/4454; G02B 6/444; G02B 6/4453; G02B 6/4459

USPC .................................................. 385/135–139
See application file for complete search history.

(56) References Cited

U.S. PATENT DOCUMENTS

| | | | | |
|---|---|---|---|---|
| 5,946,440 A | * | 8/1999 | Puetz | G02B 6/4455 385/53 |
| 8,559,784 B2 | * | 10/2013 | Ray | G02B 6/4454 385/135 |
| 9,995,898 B2 | * | 6/2018 | Krampotich | G02B 6/4446 |
| 10,234,648 B2 | * | 3/2019 | Kowalczyk | G02B 6/4457 |

* cited by examiner

*Primary Examiner* — Kaveh C Kianni
*Assistant Examiner* — Hung Q Lam
(74) *Attorney, Agent, or Firm* — The Van Winkle Law Firm; William G. Heedy (57) ABSTRACT

A fiber splice cassette includes a main chassis, a removable cover, splice sleeve holders, and four cable clamp boots. The main chassis forms a cavity having a plurality of cable organizing tabs for cable management. Splice sleeve holders are located in the cavity of the main chassis, each of the splice sleeve holders being selectively removable from a corresponding splice sleeve holder nest and being configured for specific splicing capabilities while maintaining the structural strength of the holders. The splice sleeve holder nests may be selectively and removably attached to an interior surface of the fiber cable enclosure via a variety of means to allow the splice sleeve holder nests to be easily rotated, relocated, or accessed for maintenance.

15 Claims, 13 Drawing Sheets

SPLICE SLEEVE HOLDER NEST

RELATED APPLICATIONS

This application claims priority to and incorporates entirely by reference U.S. Provisional Patent Application Ser. No. 62/964,814 filed on Jan. 23, 2020 and U.S. Provisional Patent Application Ser. No. 63/105,555 filed on Oct. 26, 2020.

FIELD OF THE INVENTION

This invention relates to a nest for a splice sleeve holder and, more particularly, to a splice sleeve holder nest for use with networking enclosures, including a fiber splice cassette for splicing connector protection and cable management.

A fiber splice cassette may be a protective enclosure for housing the splicing connection and, more particularly, to a fiber splice cassette for splicing connector protection and cable management. The incoming fiber cabling enters the enclosure from the rear of the cassette and is spliced into fiber pigtail assemblies connecting to fiber couplers at the front of the cassette.

BACKGROUND OF THE INVENTION

Splice trays and small cabinets are widely used in fiber optic cable management. Fiber splice cassettes provide a comprehensive networking solution to fiber splicing management, containing all splices within an individual cassette. With the continuously increasing sizes of data centers, high-performance networks demand high-density terminations and splice capabilities within the nexus of networking. Therefore, there exists a need for a fiber splice cassette configured to house and protect spliced connections between incoming fiber spliced to LC or SC fiber pigtail assemblies, which connect to LC or SC couplers, for superior organization, accessibility, modularity and density.

Within the fiber cable enclosures there are splice sleeve holders configured for cable management. These splice sleeve holders are typically attached to a splice tray or other enclosure via a directly attached self-adhesive. These typical attachment means prevent the splice sleeve holders from being easy to install or relocate, and further, there is no protection provided for these splice sleeve holders. These typical attachment means are also difficult to access for routine maintenance, removal, or relocation. Therefore, there exists a need for splice sleeve holders to be attached to an enclosure via a flexible, customizable, removable, selective attachment means that also provides a protective structure for holding the splice sleeve holder.

SUMMARY OF THE INVENTION

In accordance with one form of this invention, there is provided a fiber splice cassette. In one embodiment, the fiber splice cassette is designed to fit the industry standard adapter plate bulkhead with 4.000-inch width rectangular cutouts with two 0.200-inch diameter push pin holes outside of each side of the cutout per mounting location.

The cassette includes a main chassis, a removable cover, three splice sleeve holders, and four cable clamp boots. Opposing flexible latches and corresponding cylindrical protrusions are provided on the main chassis for selectively securing the cassette to an adapter plate bulkhead. The main chassis forms a cavity having a plurality of cable organizing tabs for cable management. At a first rear corner of the cassette, there is an angled cable entry point and corresponding cable clamp boots for accommodating cables with different diameters. At a second rear corner of the cassette, there is a straight cable entry point running parallel with the length of the cassette, and corresponding cable clamp boots for accommodating cables with different diameters. Three splice sleeve holders are located in the cavity of the main chassis, each of the three splice holders being selectively removable from a corresponding splice sleeve holder nest. The splice sleeve holders each have varying aperture arrangements designed and configured for specific splicing capabilities while maintaining the structural strength of the holders. The removable cassette cover allows for access to the cable for manipulation and/or removal of cable. In one embodiment, the removable cover is a clear cover made of polycarbonate. The cassette includes fiber couplers mounted on the front side of the cassette for accepting fiber pigtails.

In accordance with one form of this invention, there is provided a fiber splice cassette for use in combination with an adapter plate bulkhead, the fiber splice cassette including a main chassis forming a cavity; a removable cover which permits access to at least a portion of the main chassis; a plurality of splice sleeve holders and a plurality of splice sleeve nests, wherein each of the plurality of splice sleeve holders is selectively removable from a corresponding one of the plurality of splice sleeve holder nests; a plurality of cable clamp boots; opposing flexible latches on the main chassis, each of the flexible latches having a corresponding protrusion, the opposing flexible latches being structured and disposed for selectively securing the cassette to the adapter plate bulkhead; an angled cable entry point on the main chassis; first and second cable clamp boots each being located in the cavity adjacent the angled cable entry point, each of the first and second cable clamp boots being sized and configured for accommodating cables of different diameters; a straight cable entry point on the main chassis; and third and fourth cable clamp boots each being located in the cavity adjacent the straight cable entry point, each of the third and fourth cable clamp boots being sized and configured for accommodating cables of different diameters.

In accordance with one form of this invention, there is provided a fiber splice cassette including a main chassis forming a cavity; a plurality of splice sleeve holders and a plurality of splice sleeve nests, wherein each of the plurality of splice sleeve holders is selectively removable from a corresponding one of the plurality of splice sleeve holder nests; an angled cable entry point on the main chassis; a straight cable entry point on the main chassis; wherein each of the plurality of splice sleeve holders forms a plurality of first apertures at a first depth and a plurality of second apertures at a second depth on a first side of each of the plurality of splice sleeve holders, wherein each of the plurality of first apertures and plurality of second apertures are accessible by a corresponding notch; and wherein each of the plurality of splice sleeve holders forms a plurality of third apertures at a third depth and a plurality of fourth apertures at a fourth depth on a second side of each of the plurality of splice sleeve holders, wherein each of the plurality of third apertures and plurality of fourth apertures are accessible by a corresponding notch.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION

Referring to the several views of the drawings, the fiber splice cassette and splice sleeve holder nest are shown and described herein.

Figure 1:
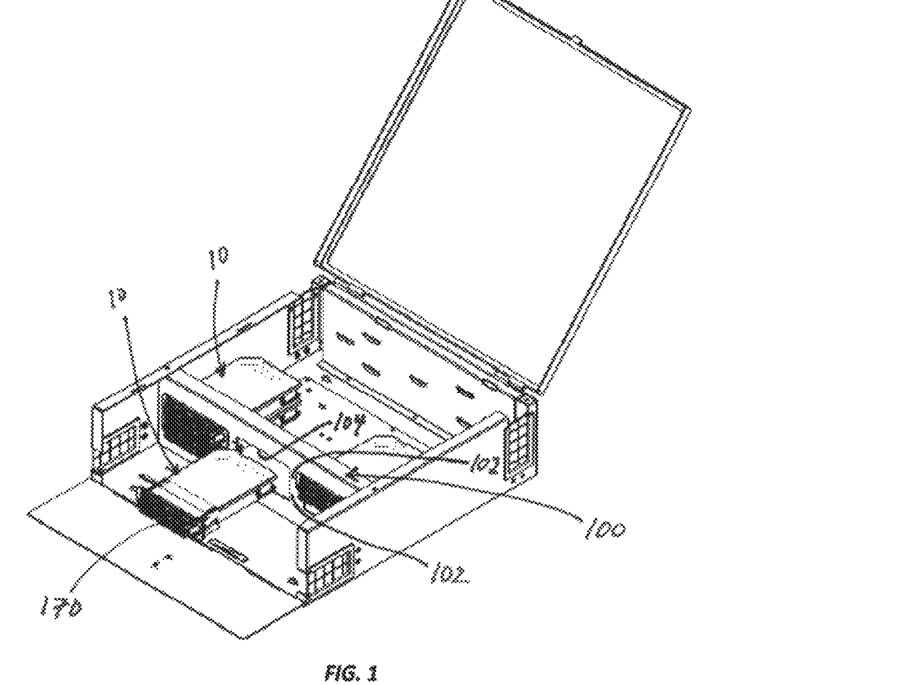
FIG. 1 is a perspective view of an adapter plate bulkhead including an installed fiber splice cassette.

Referring initially to FIG. 1, the fiber splice cassette 10 is designed to be installed and removed from the front side of an adapter plate bulkhead 100, which is traditionally made from metal materials widely used in rack mount and wall mount enclosures. The fiber splice cassette 10 utilizes two flexible latches 12 working in conjunction with two cylindrical protrusions 14 (see FIG. 7) to secure the cassette 10 to the adapter plate bulkhead 100. The cylindrical protrusions 14 engage the push pin mounting holes 102 in the bulkhead 100, thereby preventing side to side movement of the cassette 10 while the flexible latches 12 engage the backside of the bulkhead 100 securing the cassette 10 in place. To remove the cassette 10 from the bulkhead 100, release tabs 16 on respective flexible latches 12 may be selectively squeezed together. In one embodiment, the fiber splice cassette 10 is designed to fit an industry standard adapter plate bulkhead 100 with three rectangular cutouts 104, each having a width of 4.000 inches. Each cutout 104 has two mounting locations, each having the two 0.200-inch diameter push pin holes 102 adjacently located to both vertical sides of each cutout 104. The distance between these two push pin holes 102 for the same mounting location is 4.500 inches.

Figure 2:
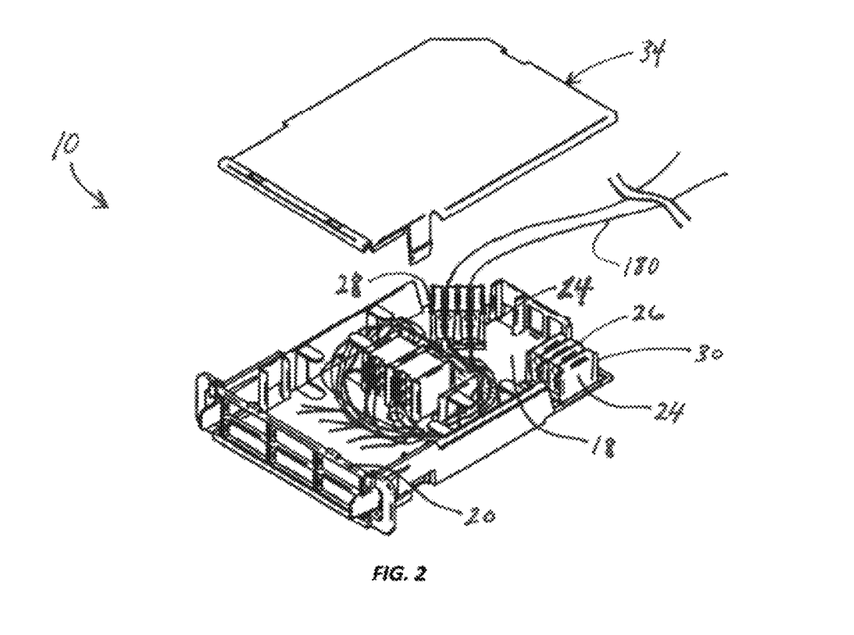
FIG. 2 is a perspective view of a fiber splice cassette including incoming fiber entering from the rear of the cassette and spliced to fiber pigtail assemblies which connect to couplers at front of the cassette.

Referring now to FIG. 2, the fiber splice cassette 10 is shown with an incoming fiber optic cable 180 entering from a rear corner of the fiber splice cassette 10 into a cavity 18 and then being spliced and connected to the fiber couplers 170 (see FIG. 1) installed on a removable adapter plate 20 of the fiber splice cassette 10. A plurality of cable organizing tabs 22 are formed within the cavity 18, while two cable clamp boot nests 24 and corresponding cable clamp boots 26 are located at opposing rear corners, namely an angled cable exit point 28 and a straight cable exit point 30, for cable organization.

Referring now to FIGS. 3-12, the fiber splice cassette 10 is shown without fiber optic cable 180 for purposes of clarity. The fiber splice cassette 10 is primarily formed by a main chassis 32 and a removable cover 34. The main chassis 32 is a cuboid-like enclosure surrounding the cavity 18. The front side of the main chassis 32 is formed by a removable adapter plate 20 on which the fiber couplers 170 are installed. Varying designs of the removable adapter plates are provided (see FIGS. 13-15) for varying splice applications.

Figure 3:
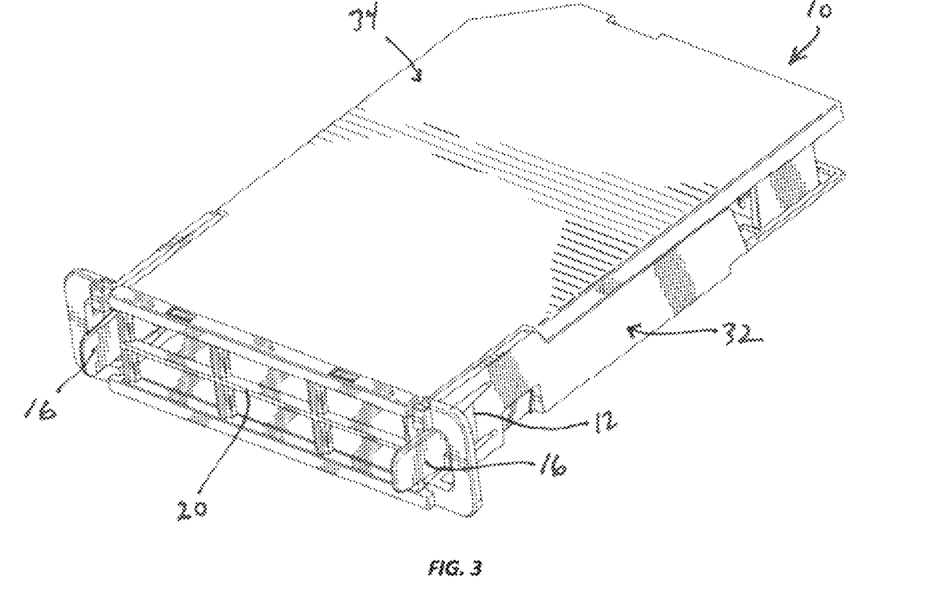
FIG. 3 is a perspective view of the fiber splice cassette of the present invention.
Figure 4:
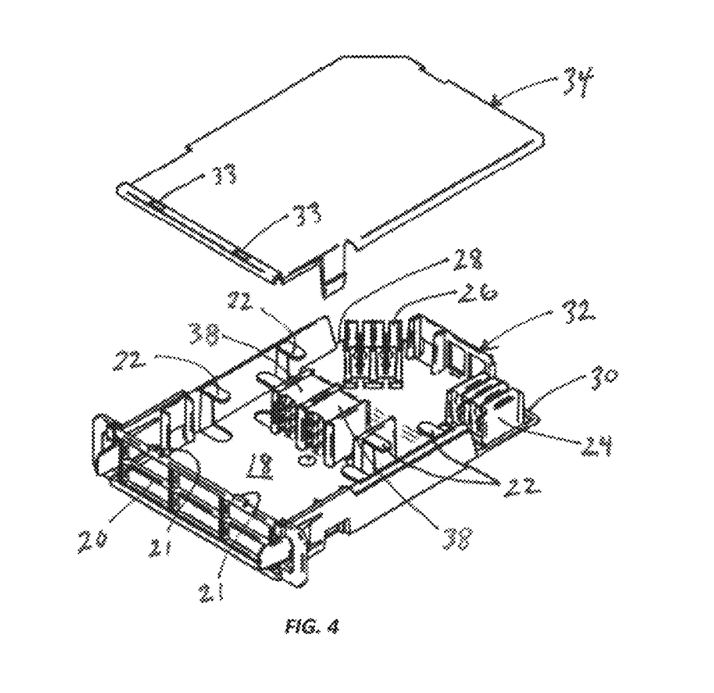
FIG. 4 is a perspective view of the fiber splice cassette showing the removable cover apart from the main chassis.
Figure 5:
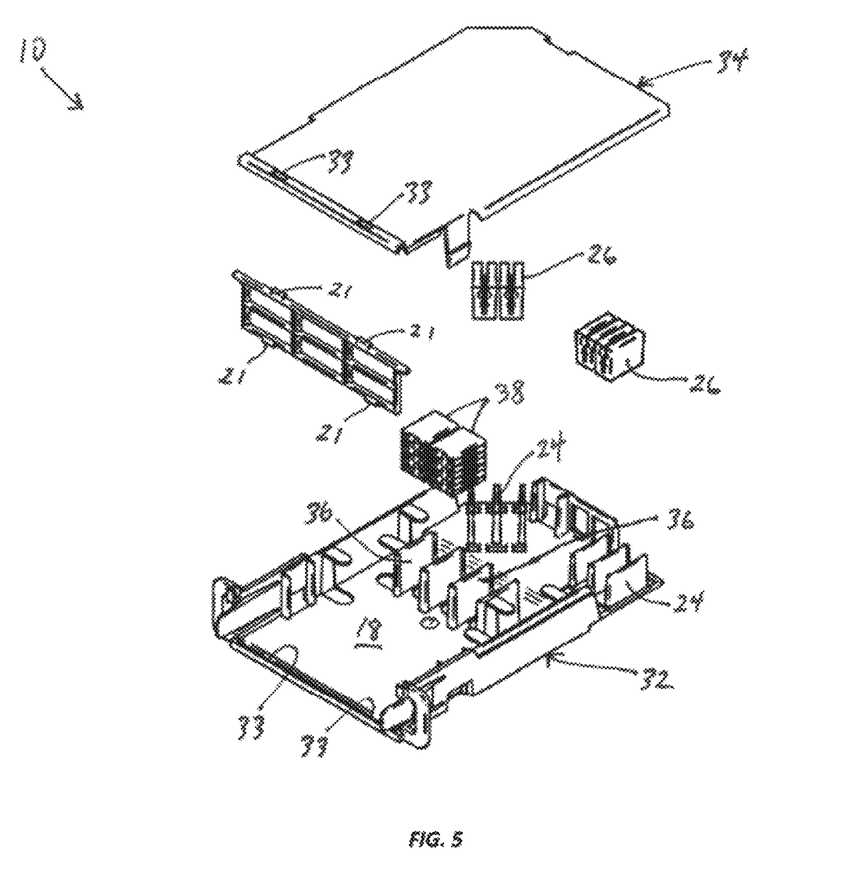
FIG. 5 is an exploded view of the fiber splice cassette.

The removable adapter plate 20 includes a plurality of notches 21 extending from an outer perimeter 23 of the removable adapter plate 20. Each of the notches 21 is sized and configured for engaged receipt in a corresponding one of plurality of receptacles 33, which are located on the main chassis 32 and the removable cover 34. Accordingly, when the fiber splice cassette 10 is assembled, the plurality of notches 21 mated with corresponding receptacles 33 forms a plurality of engagements points for increased structural integrity of the fiber splice cassette 10.

Figure 6:
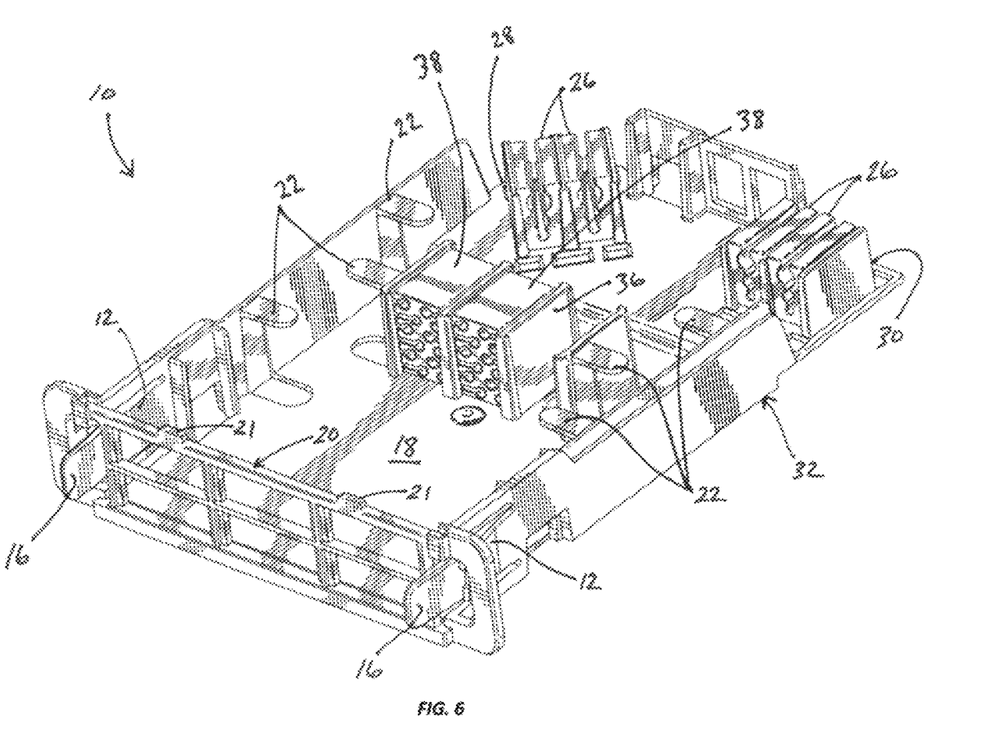
FIG. 6 is a perspective view of the fiber splice cassette illustrating the inner cavity of the main chassis.
Figure 7:
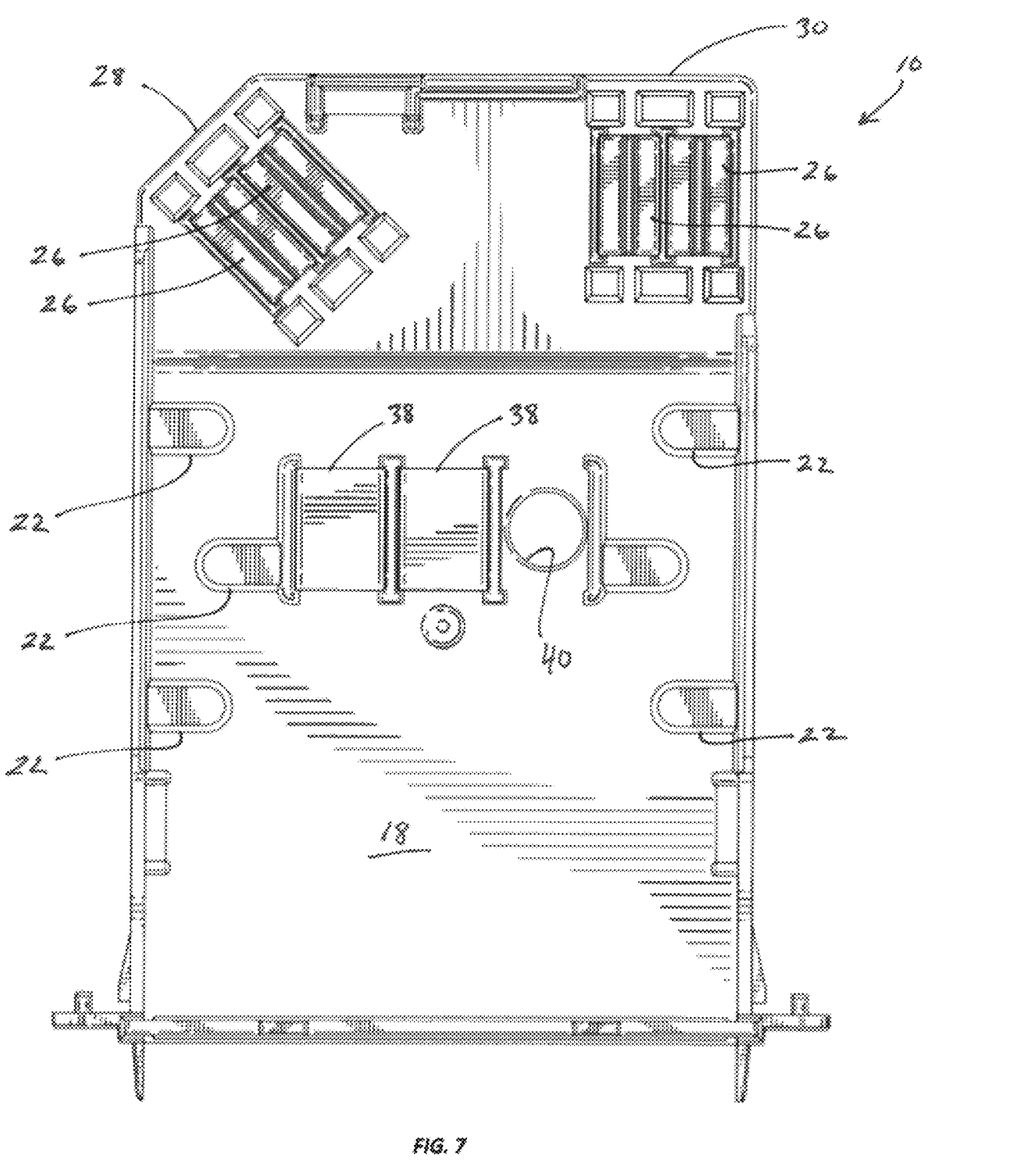
FIG. 7 is a top plan view of the fiber splice cassette illustrating the inner cavity of the main chassis.
Figure 8:
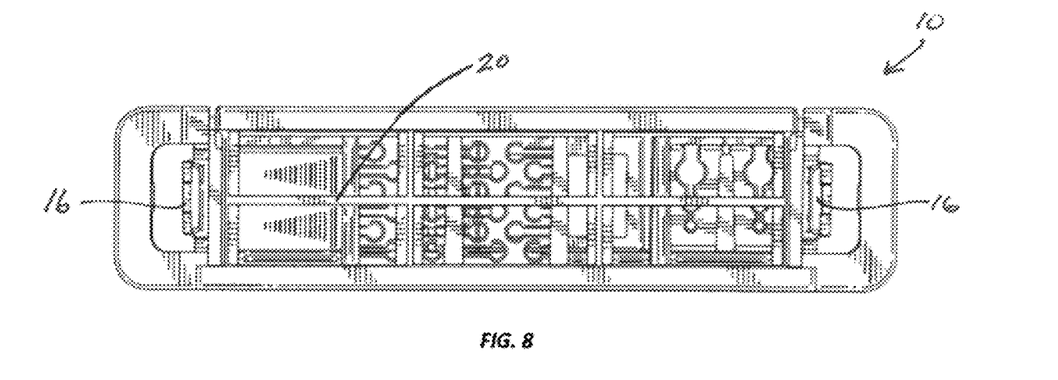
FIG. 8 is a front elevational view of the fiber splice cassette.
Figure 9:
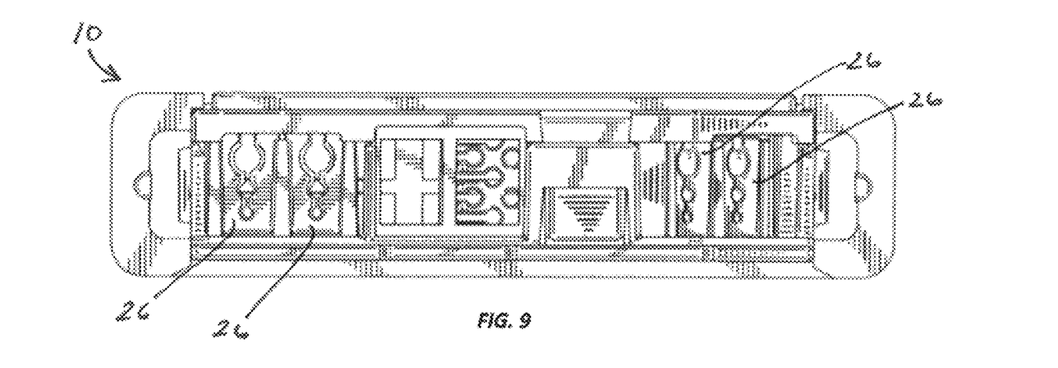
FIG. 9 is a rear elevational view of the fiber splice cassette.
Figure 10:
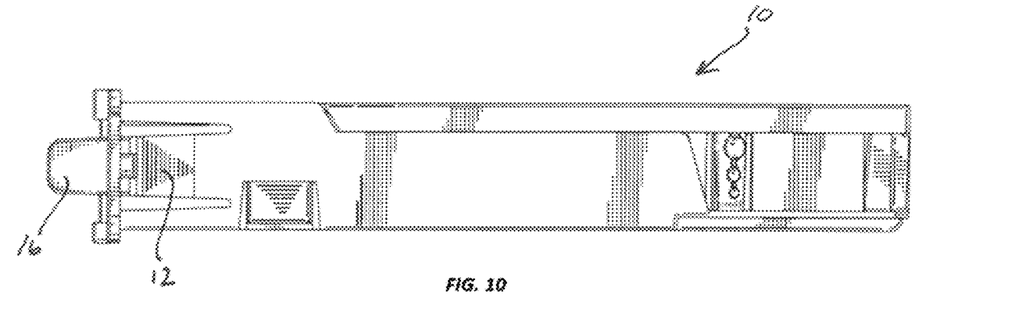
FIG. 10 is a left side elevational view of the fiber splice cassette.
Figure 11:
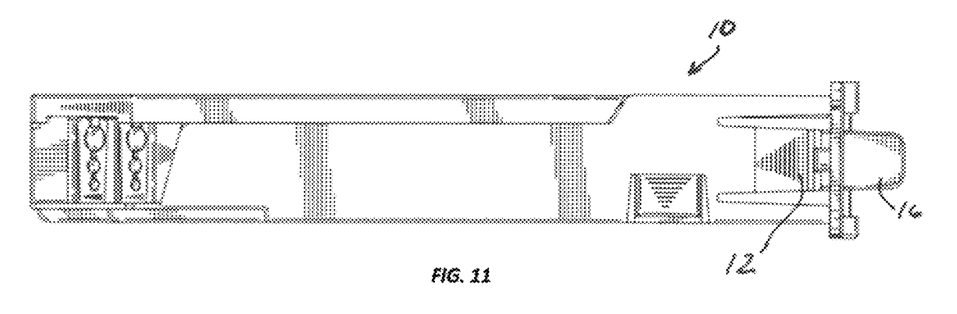
FIG. 11 is a right side elevational view of the fiber splice cassette.

Within the cavity 18, the cable organizing tabs 22 are provided for cable routing. Centrally located within the cavity 18 are two splice sleeve holder nests 36 in which corresponding splice sleeve holders 38 are fitted. In accordance with one embodiment, multiple counterclockwise arrows on the upper-facing surface of the main chassis 32 may be provided for indicating the cable routing direction.

The cassette 10 includes opposing cable entry points, including an angled cable entry point 28 and a straight cable entry point 30. In one embodiment, at a first rear corner of the main chassis 32, there is the angled cable entry point 28 and corresponding cable clamp boots 26 for accommodating cables 180 of varying diameters, and at a second rear corner of the main chassis 32, there is the straight cable entry point 30 running parallel with the length of the cassette 10, and corresponding cable clamp boots 26 for accommodating cables 180 of varying diameters. According to one embodiment, the ends of each cable clamp boot nest 24 may include cable tie lugs extending therefrom for securing larger cables without using the cable clamp boots.

Figure 13:
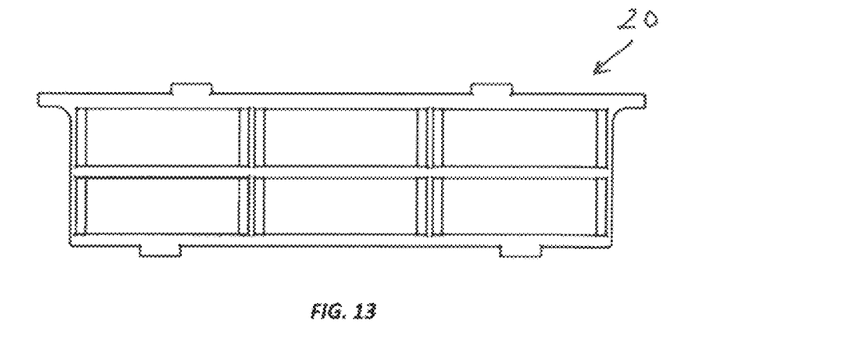
FIG. 13 is a front elevational view of a removable adapter plate in accordance with one embodiment.
Figure 14:
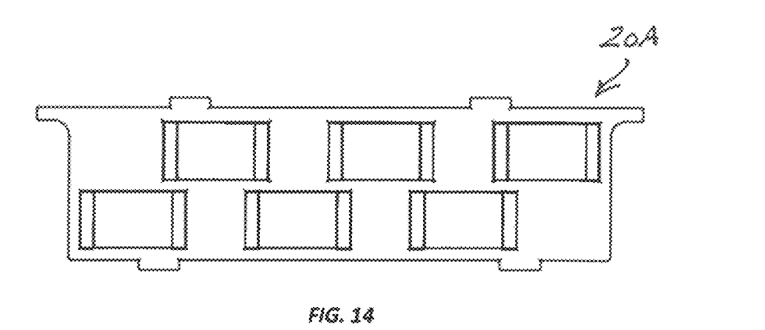
FIG. 14 is a front elevational view of a removable adapter plate in accordance with one embodiment.
Figure 15:
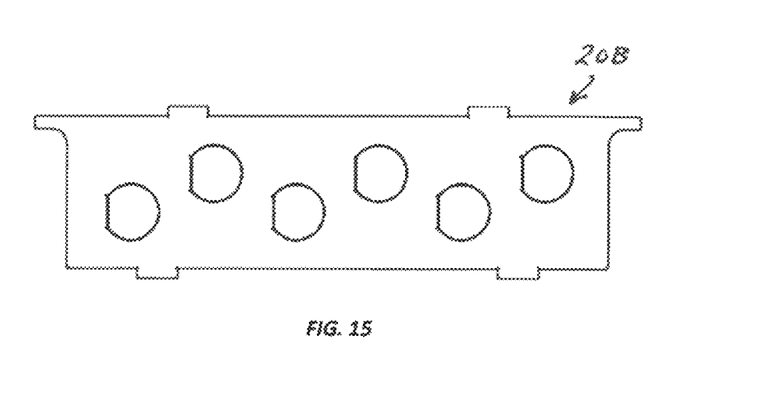
FIG. 15 is a front elevational view of a removable adapter plate in accordance with one embodiment.

Referring now to FIGS. 13-15, variations of the removable adapter plate are illustrated, including removable adapter plate 20, removable adapter plate 20A and removable adapter plate 20B, each being applicable for corresponding fiber coupler type (e.g., LC, SC, and ST). The removable adapter plates 20, 20A and 20B are interchangeable with the main chassis 32 of the fiber splice cassette.

Figure 12:
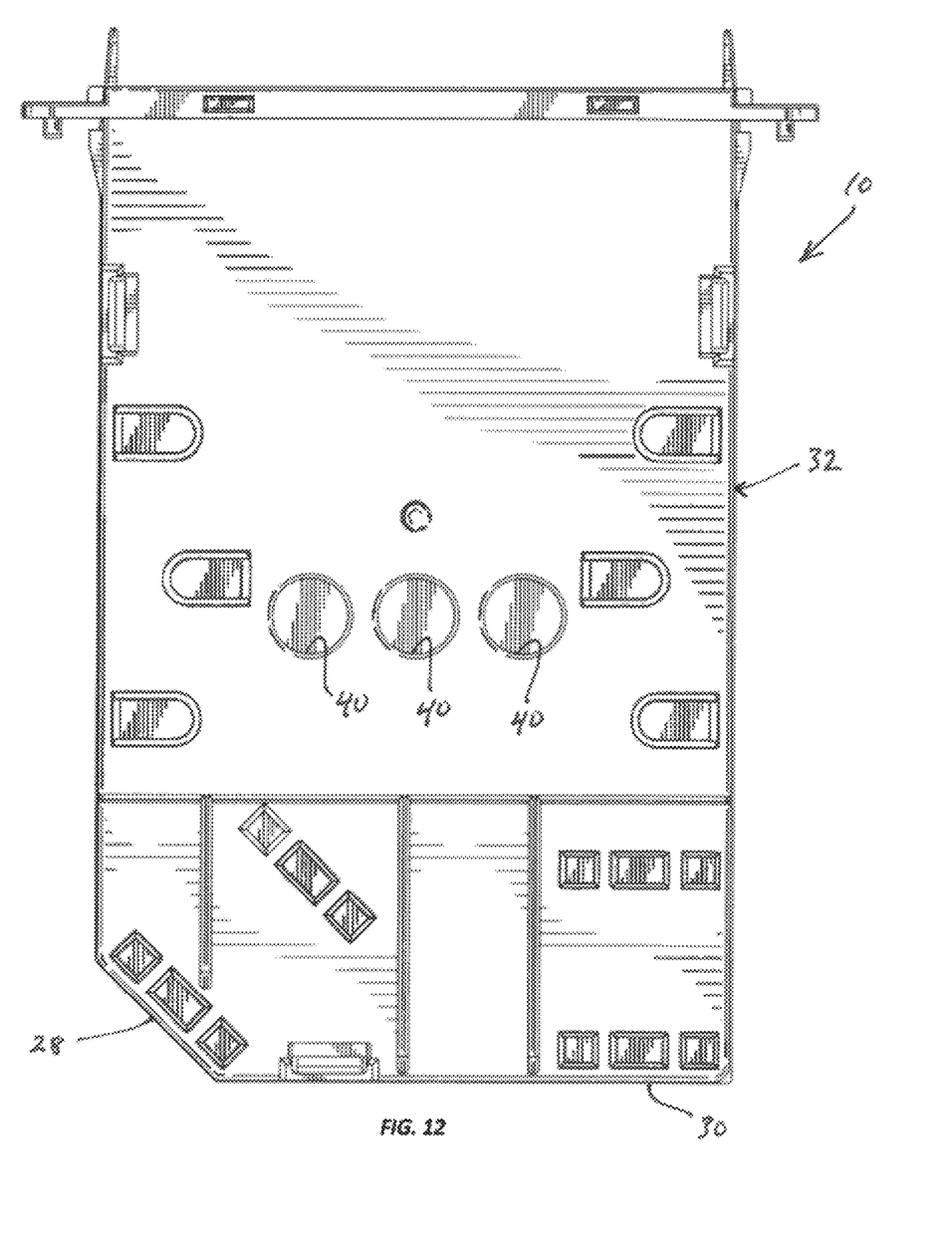
FIG. 12 is a bottom plan view of the fiber splice cassette.

With specific reference to FIG. 12, a plurality of access holes 40 are formed on the main chassis 32 for selectively accessing and pushing out the splice sleeve holders 38.

Figure 16:
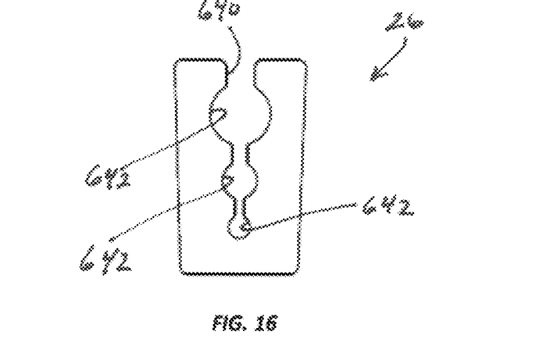
FIG. 16 is a front elevational view of the cable clamp boot.

FIG. 16 illustrates the cable clamp boot 26, which forms a vertical notch 640 cut from the top side of the cable clamp boot 26. There are three apertures 642 of varying sizes along the vertical notch 640, and the diameters of the apertures 642 decrease with increasing depth for accommodating different diameter cables 180. The material of the cable clamp boot 26 is rubber or similar flexible material.

Figure 17:
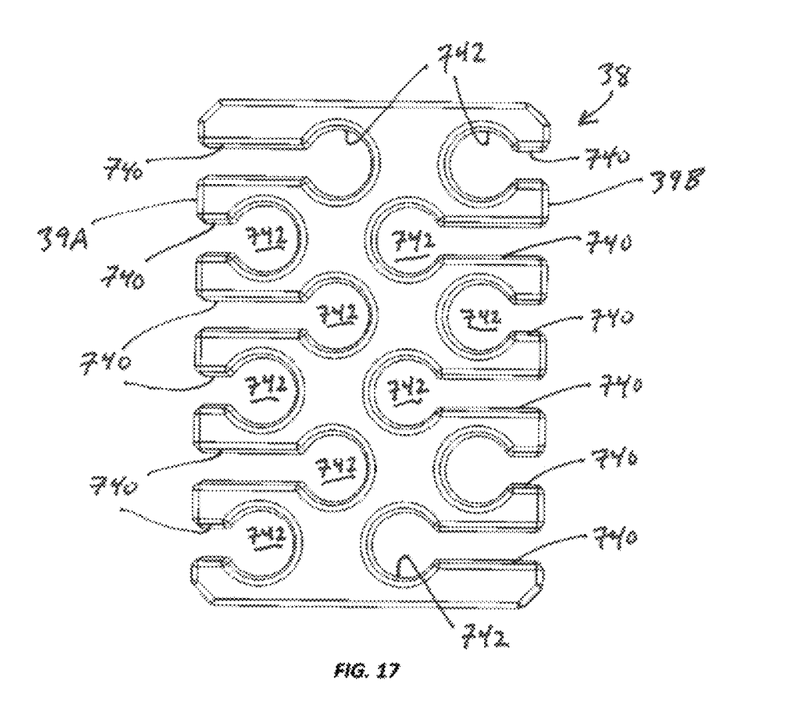
FIG. 17 is a front elevational view of the splice sleeve holder.

FIG. 17 illustrates the splice sleeve holder 38, which forms multiple, staggered horizontal notches 740 cut from opposing sides 39A and 39B of the splice sleeve holder 38. In a preferred embodiment, the notches 740 are formed horizontally. There are multiple apertures 742 along the horizontal notches 740 for achieving high density splicing capabilities. The apertures 742 are located at different depths along the length of the horizontal notches 740, in a staggered arrangement as shown in FIG. 17, so that the multiple notches 740 will not limit the structural integrity of the splice sleeve holder 38, while also permitting a user to selectively remove, replace or otherwise access any given cable without having to remove other cabling, which is the case for splice sleeve holders having vertically aligned notches. The material of the splice sleeve holder 38 is rubber or similar flexible material.

Use of the fiber splice cassette 10 includes storing approximately one yard of pigtail inside the main chassis 32 along the cable organizing tabs 22; splicing and cleaving pigtails by, heat shrinking a protective sleeve over the joint where the cable 180 has been stripped and exposed to the individual buffered fibers; placing the protective sleeve in a splice sleeve holder 38; pushing the splice sleeve holder 38 into a splice sleeve holder nest 36; and attaching the cover 34. The exiting cable is generally secured by placing in a cable clamp boot 26 and then pushing into a corresponding cable clamp boot nest 24. For thicker cables, the exiting cable 180 may use cable ties and the cable tie lugs provided at the tray exit point.

Figure 18:
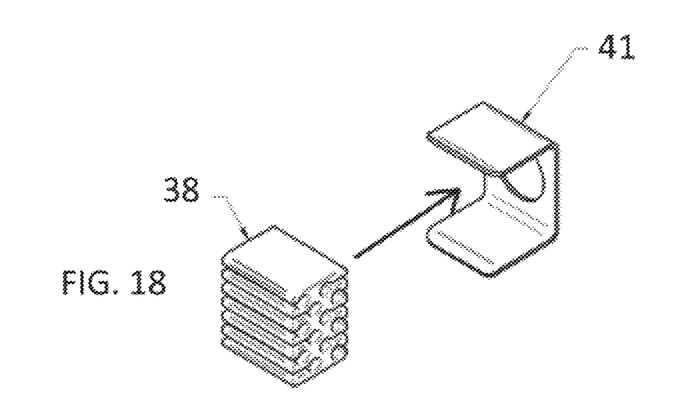
FIG. 18 is a perspective view of a splice sleeve holder and a splice sleeve holder nest.

FIG. 18 illustrates the splice sleeve holder nest 41, showing an exemplary embodiment in which a splice sleeve holder 38 is inserted to be secured within splice sleeve holder nest 41. The splice sleeve holder nest may be constructed from rubber, plastic, or another similar material.

Figure 19:
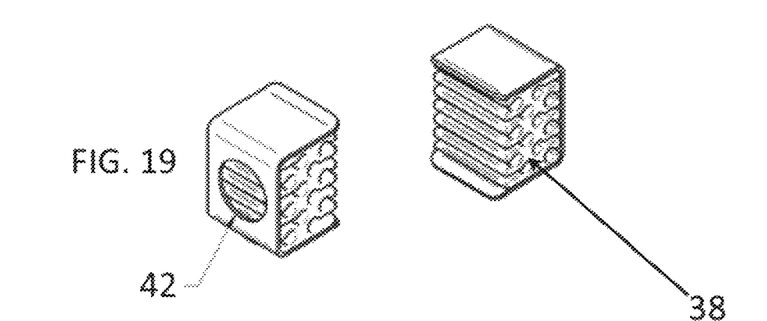
FIG. 19 is perspective view of a splice sleeve holder secured within a splice sleeve holder nest, showing a front and rear perspective view.

FIG. 19 illustrates an alternative view of the splice sleeve holder nest 41, showing an exemplary embodiment wherein an access hole 42 is present to facilitate removal of the splice sleeve holder 38. The splice sleeve holder 38 is shown as secured within the splice sleeve holder nest 41.

Figure 20:
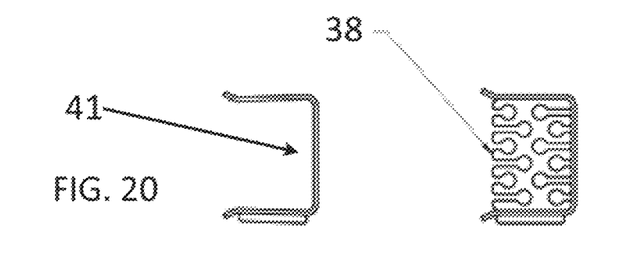
FIG. 20 is a side elevational view of a splice sleeve holder nest, showing the splice holder nest empty and showing a splice sleeve holder secured within the splice sleeve holder nest.

FIG. 20 is an exemplary embodiment of the splice sleeve holder nest 41 illustrating the slight angle in the upper and lower arms of the splice sleeve holder nest 41. It will be appreciated that the slight angling in the upper and lower arms of the splice sleeve holder nest 41 may be designed in various configurations to allow for a secure fit of the splice sleeve holder 38, while allowing the splice sleeve holder 38 to be easily removed from the splice sleeve holder nest 41 as needed. The slight angling in the upper and lower arms provides for an increased tensioned grip on a splice sleeve holder 38, as shown secured within the splice sleeve holder nest 41.

Figure 21:
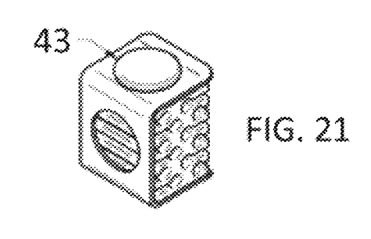
FIG. 21 is a perspective view of a self-adhesive magnet attached to a splice sleeve holder nest.

FIG. 21 is an illustration of a splice sleeve holder 38 secured inside a splice sleeve holder nest 41. In this embodiment, self-adhesive magnet 43 is attached to an upper or lower surface of a splice sleeve holder nest 41. A typical enclosure, including an optical installation cabinet or similar design, may be composed of a cold-rolled steel or similar material that allows the self-adhesive magnet 43 to be selectively secured to the steel surface.

The magnetic nature of this attachment means allows for the splice sleeve holder nest 41 to be easily installed and located on a surface of an enclosure. Further, this magnetic means of attachment allows the splice sleeve holder nest 41 to be rotated, removed, and relocated, allowing for easy access to the splice sleeve holder 38 for maintenance, removal, reconfiguration, or relocation. It will be appreciated that the self-adhesive magnet 43 may be selectively applied to different positions on the surface of the splice sleeve holder nest 41. The self-adhesive magnet 43 may also be adapted to adhere the splice sleeve holder nest 41 onto any surface that allows for magnetic attachment.

Figure 22:
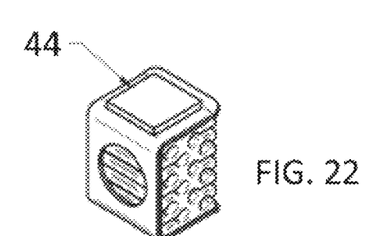
FIG. 22 is a perspective view of a double-sided adhesive foam pad attached to a splice sleeve holder nest.

FIG. 22 is an illustration of a splice sleeve holder 38 secured inside a splice sleeve holder nest 41. In this embodiment, double-sided adhesive foam pad 44 is attached to an upper or lower surface of a splice sleeve holder nest 41. The self-adhesive nature of this pad allows for the splice sleeve holder nest 41 to be easily installed and located on a surface of an enclosure. Further, this self-adhesive means of attachment allows the splice sleeve holder nest 41 to be removed and relocated, allowing for easy access to the splice sleeve holder 38 for maintenance, removal, reconfiguration, or relocation. It will be appreciated that the self-adhesive foam pad 44 may contain various types of adhesive, including those that allow for self-adhesive foam pad 44 to be reused without losing the adhesive properties. The self-adhesive foam pad 44 may be adapted to be selectively applied to different positions on the surface of the splice sleeve holder nest 41.

Figure 23:
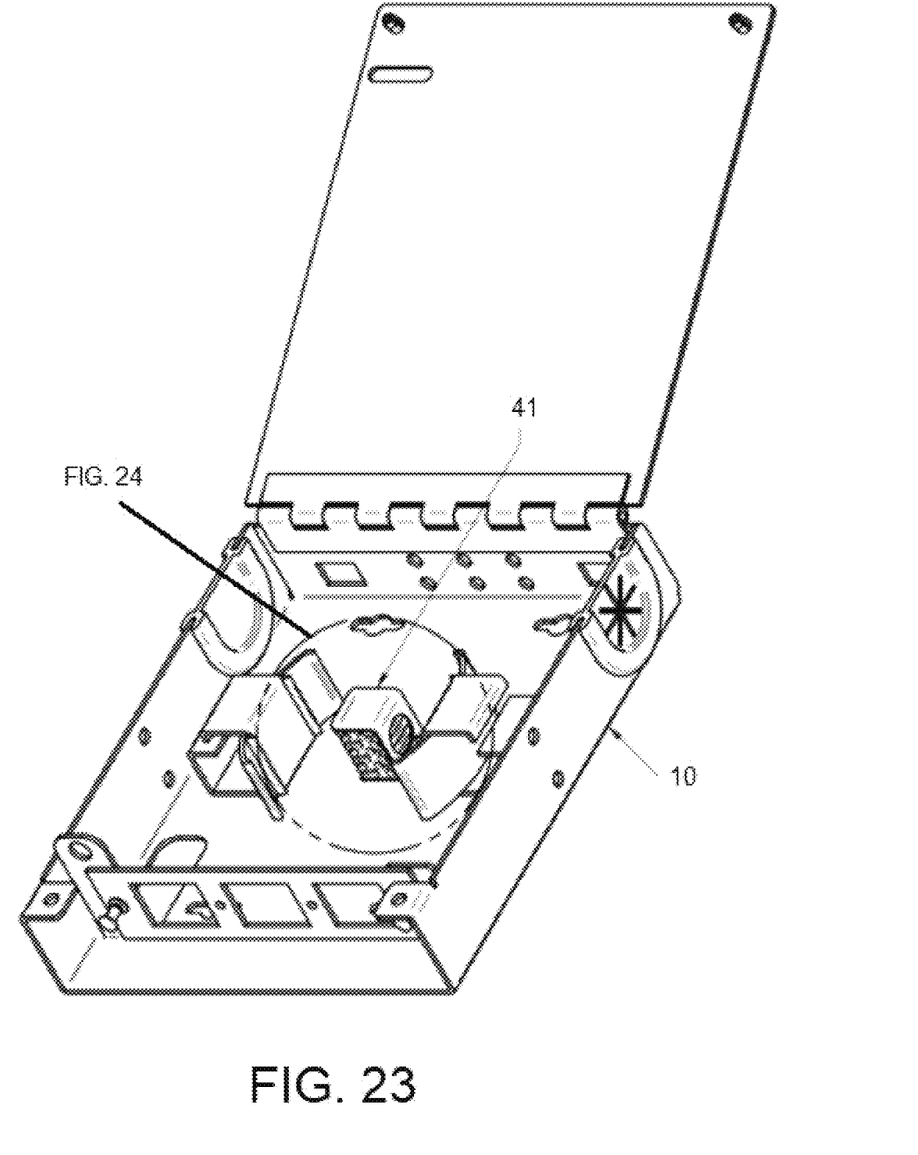
FIG. 23 is a perspective view of a splice sleeve holder nest selectively attached to an inner surface of a fiber connection enclosure.
Figure 24:
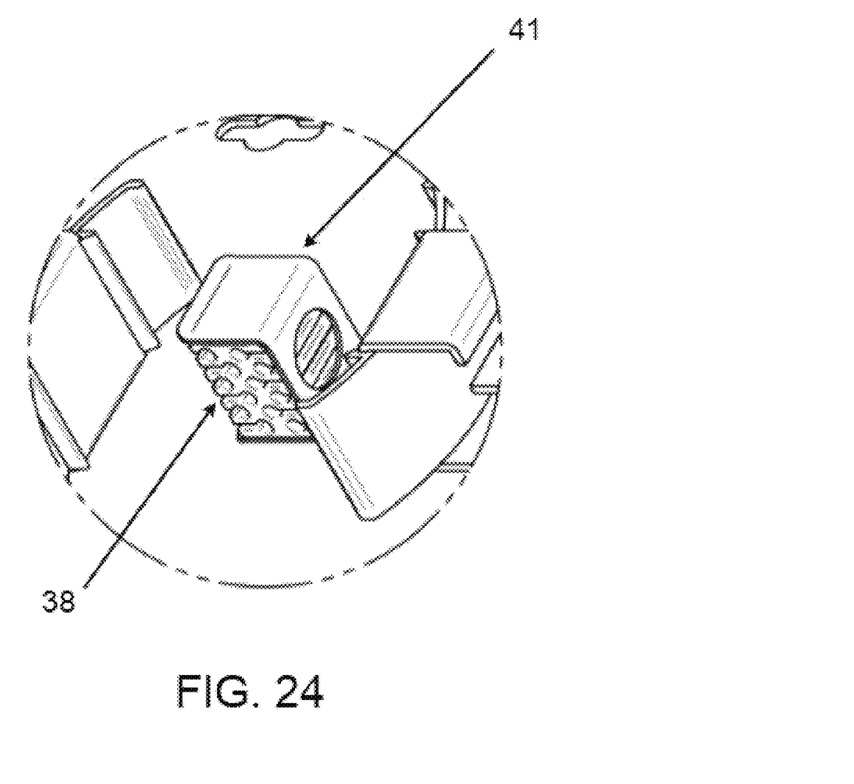
FIG. 24 is an isolated view of the splice sleeve holder nest.

FIG. 23 is an illustration of a typical fiber connection enclosure, showing a splice sleeve holder nest 41 mounted to an interior surface of the fiber connection enclosure. The inset illustration shows a magnified view of the splice sleeve holder nest 41 within the fiber connection enclosure, including the splice sleeve holder 38 secured within the splice sleeve holder nest 41.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations may be well known in the art, and because they do not facilitate a better understanding of the present disclosure, a discussion of such elements and operations is not provided herein. The present disclosure is deemed to inherently include all such elements, variations, and modifications to the described aspects that would be known to those of ordinary skill in the art, particularly in view of reading the present disclosure. Any headings used herein are for organizational purposes only and are not meant to be used to limit the scope of the description or the claims.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

The terms "includes," "has," "having," or "exhibits," or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", "around", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "fray", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step are used in a permissive sense rather than a mandatory sense, and may not be required for every implementation or embodiment.

The subject matter described herein is provided by way of illustration only and should not be construed as limiting the nature and scope of the claims herein. While different embodiments have been provided above, it is not possible to describe every conceivable combination of components or methodologies for implementing the disclosed subject matter, and one of ordinary skill in the art may recognize that further combinations and permutations that are possible. Furthermore, the nature and scope of the claims is not necessarily limited to implementations that solve any or all disadvantages which may have been noted in any part of this disclosure. Various modifications and changes may be made to the subject matter described herein without following, or departing from the spirit and scope of, the exemplary embodiments and applications illustrated and described herein, Although the subject matter presented herein has been described in language specific to components used therein, it is to be understood that the scope of the claims is not necessarily limited to the specific components or characteristics thereof described herein; rather, the specific components and characteristics thereof are disclosed as example forms of implementing the disclosed subject matter. Accordingly, the disclosed subject matter is intended to embrace all alterations, modifications, and variations, that fall within the scope and spirit of any claims that may be written therefor.

The foregoing Detailed Description is intended only to convey to a person having ordinary skill in the art the fundamental aspects of the disclosed subject matter and is not intended to limit, and should not be construed as limiting, the scope of the claims herein. Further, in the foregoing Detailed Description, various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, patentable subject matter may lie in less than all features of a single disclosed embodiment. Thus any claims following below are hereby incorporated into the Detailed Description, with each claim standing on its own as a separate embodiment.

What is claimed is:

1. A fiber splice cassette for use in combination with an adapter plate bulkhead, the fiber splice cassette comprising:
   a main chassis forming a cavity;
   a removable cover which permits access to at least a portion of the main chassis;
   a plurality of splice sleeve holders and a plurality of splice sleeve nests, wherein each of the plurality of splice sleeve holders is selectively removable from a corresponding one of the plurality of splice sleeve holder nests;
   a plurality of cable clamp boots;
   opposing flexible latches on the main chassis, each of the flexible latches having a corresponding protrusion, the opposing flexible latches being structured and disposed for selectively securing the cassette to the adapter plate bulkhead;
   an angled cable entry point on the main chassis;
   first and second cable clamp boots each being located in the cavity adjacent the angled cable entry point, each of the first and second cable clamp boots being sized and configured for accommodating cables of different diameters;
   a straight cable entry point on the main chassis; and
   third and fourth cable clamp boots each being located in the cavity adjacent the straight cable entry point, each of the third and fourth cable clamp boots being sized and configured for accommodating cables of different diameters.

2. The fiber splice cassette as recited in claim 1 further comprising a plurality of cable organizing tabs in the cavity of the main chassis.

3. The fiber splice cassette as recited in claim 1 wherein the plurality of splice sleeve holders comprises three splice sleeve holders.

4. The fiber splice cassette as recited in claim 1 wherein each of the plurality of splice sleeve holders forms a plurality of first apertures at a first depth and a plurality of second apertures at a second depth on a first side of each of the plurality of splice sleeve holders, wherein each of the plurality of first apertures and plurality of second apertures are accessible by a corresponding notch.

5. The fiber splice cassette as recited in claim 4 wherein each of the plurality of splice sleeve holders forms a plurality of third apertures at a third depth and a plurality of fourth apertures at a fourth depth on a second side of each of the plurality of splice sleeve holders, wherein each of the plurality of third apertures and plurality of fourth apertures are accessible by a corresponding notch.

6. The fiber splice cassette as recited in claim 1 wherein each of the plurality of splice sleeve nests includes a magnet for selective attachment to the main chassis.

7. The fiber splice cassette as recited in claim 1 wherein each of the plurality of splice sleeve nests includes an adhesive pad for selective attachment to the main chassis.

8. The fiber splice cassette as recited in claim 1 further comprising an access hole formed on each of the plurality of splice sleeve nests for facilitating removal of the corresponding one of the plurality of splice sleeve holders.

9. The fiber splice cassette as recited in claim 1 wherein the removable cover is at least partially transparent.

10. A fiber splice cassette comprising:
    a main chassis forming a cavity;
    a plurality of splice sleeve holders and a plurality of splice sleeve nests, wherein each of the plurality of splice sleeve holders is selectively removable from a corresponding one of the plurality of splice sleeve holder nests;
    an angled cable entry point on the main chassis;
    a straight cable entry point on the main chassis;
    wherein each of the plurality of splice sleeve holders forms a plurality of first apertures at a first depth and a plurality of second apertures at a second depth on a first side of each of the plurality of splice sleeve holders, wherein each of the plurality of first apertures and plurality of second apertures are accessible by a corresponding notch; and
    wherein each of the plurality of splice sleeve holders forms a plurality of third apertures at a third depth and a plurality of fourth apertures at a fourth depth on a second side of each of the plurality of splice sleeve holders, wherein each of the plurality of third apertures and plurality of fourth apertures are accessible by a corresponding notch.

11. The fiber splice cassette as recited in claim 10 further comprising a plurality of cable organizing tabs in the cavity of the main chassis.

12. The fiber splice cassette as recited in claim 10 wherein the plurality of splice sleeve holders comprises three splice sleeve holders.

13. The fiber splice cassette as recited in claim 10 wherein each of the plurality of splice sleeve nests includes a magnet for selective attachment to the main chassis.

14. The fiber splice cassette as recited in claim 10 wherein each of the plurality of splice sleeve nests includes an adhesive pad for selective attachment to the main chassis.

15. The fiber splice cassette as recited in claim 10 further comprising an access hole formed on each of the plurality of splice sleeve nests for facilitating removal of the corresponding one of the plurality of splice sleeve holders.

* * * * *